Aug. 18, 1931. J. A. WHITCOMB 1,819,579
MOTOR VEHICLE FRONT END SUSPENSION
Filed May 2, 1929 3 Sheets-Sheet 1
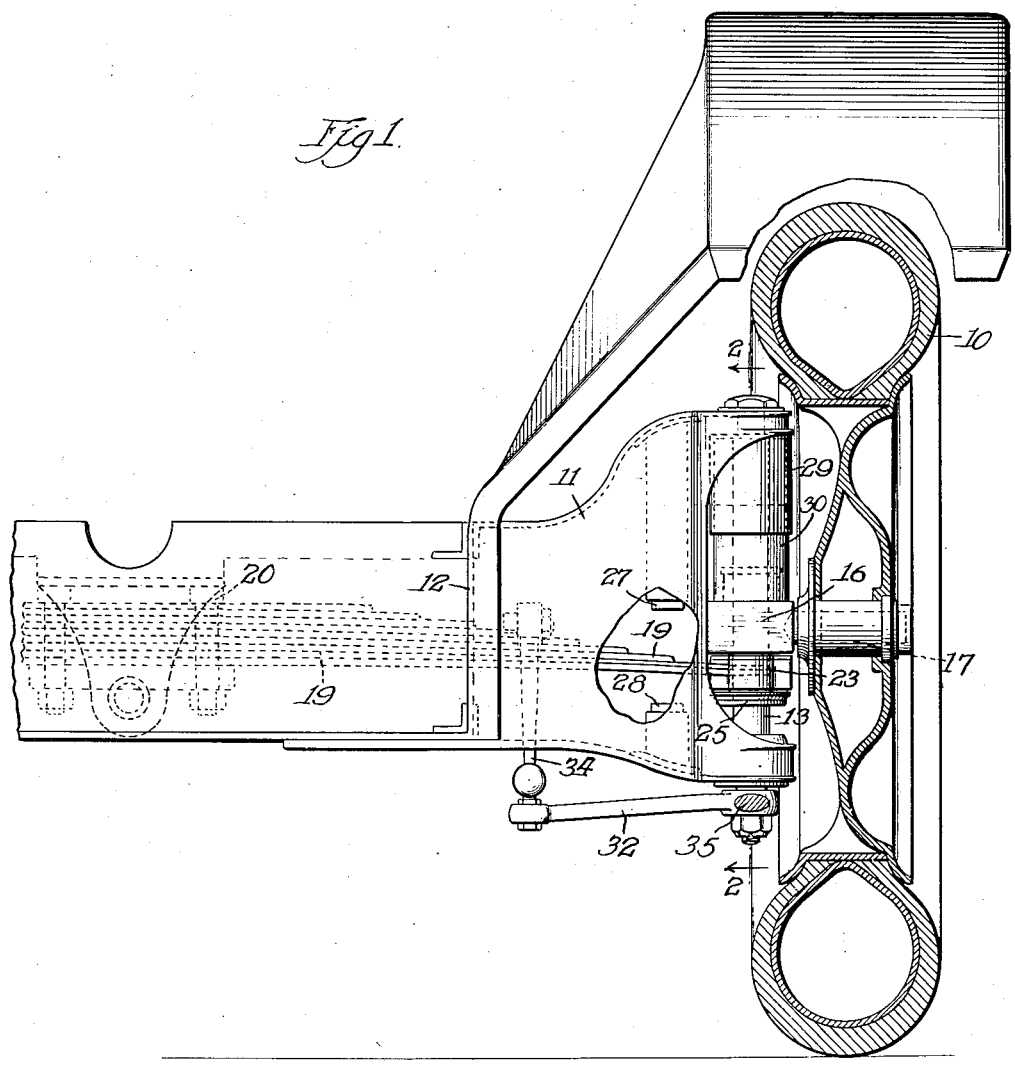

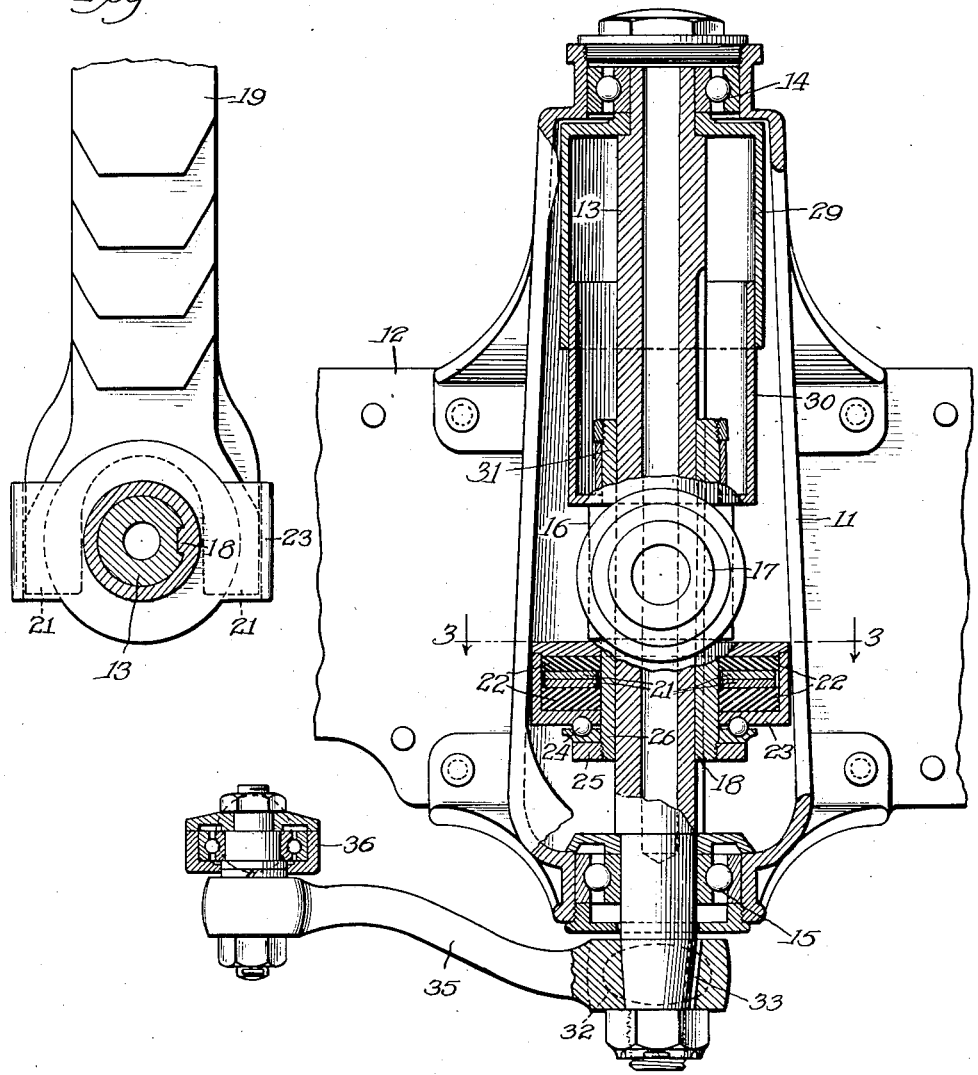

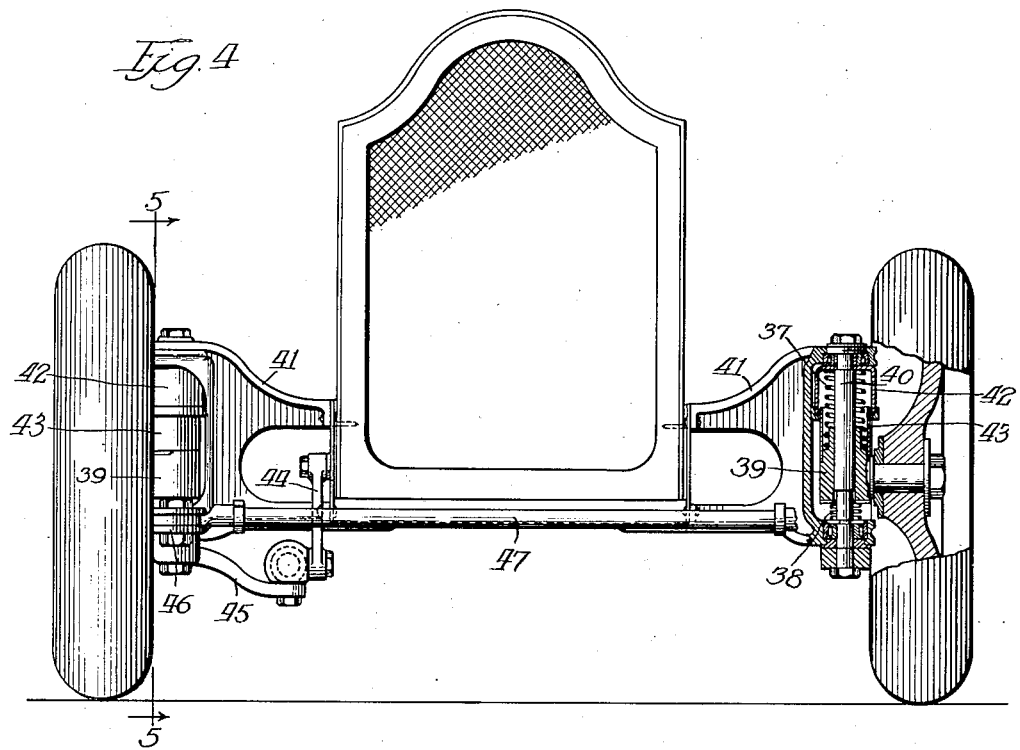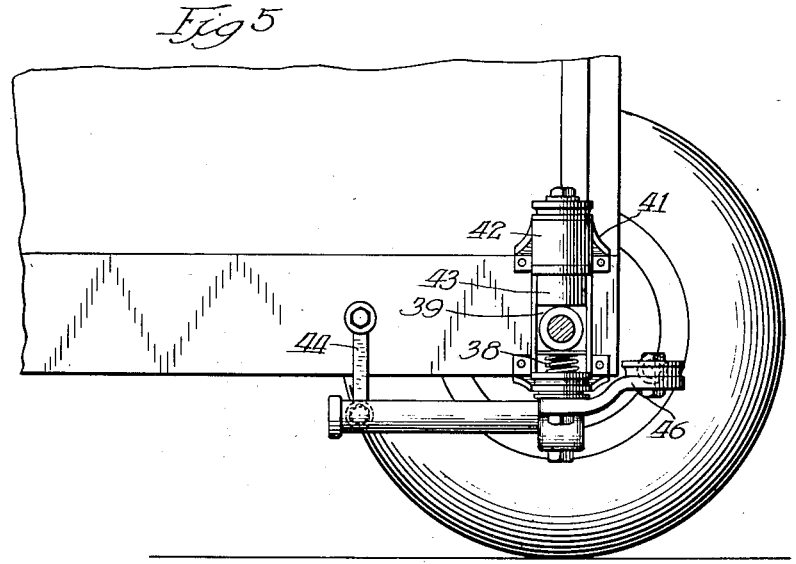

Patented Aug. 18, 1931

1,819,579

UNITED STATES PATENT OFFICE

JAMES A. WHITCOMB, OF KENOSHA, WISCONSIN; EMMA E. WHITCOMB AND THELMA G. WHITCOMB, OF KENOSHA, WISCONSIN, ADMINISTRATRICES OF SAID JAMES A. WHITCOMB, DECEASED

MOTOR VEHICLE FRONT END SUSPENSION

Application filed May 2, 1929. Serial No. 359,735.

The present invention has to do with motor vehicles, and is particularly concerned with the mounting of the front steering wheels, although certain features of the invention are of more general application.

The purpose of the invention is to provide a novel front wheel mounting in which the ordinary axle is dispensed with and the wheels are preferably independently sprung.

The axleless front wheel mounting of the invention greatly reduces the weight, both sprung and unsprung, increases the strength and prolongs the life of the vehicle in which it is incorporated; gives excellent riding and steering qualities to the vehicle; and positively eliminates all wobbling and shimmying of the wheels at all speeds regardless of the condition of the road, the wheels traveling in an easy, straight, forward manner at all times.

While the foregoing statements are indicative of the nature of the invention, other objects and advantages will be evident to those skilled in the art upon a full understanding of the construction, arrangement and operation of the improved wheel mounting.

Two structurally different forms of the invention are presented herein for the purpose of exemplification, but it will of course be appreciated that the invention is susceptible of embodiment in other modified forms coming equally within the scope of the appended claims.

In the accompanying drawings:

Fig. 1 is a fragmentary front view of a motor vehicle, with the front wheels mounted in accordance with the invention;

Fig. 2 is a vertical section through one of the steering knuckles, taken on the line 2—2 of Fig. 1;

Fig. 3 is a horizontal section, taken on the line 3—3 of Fig. 2;

Fig. 4 is a view corresponding generally to Fig. 1, showing a modification of the invention; and Fig. 5 is a vertical section, taken on the line 5—5 of Fig. 4.

The form of the invention shown in Figs. 1, 2 and 3 will first be described. As will be observed, the ordinary front spring and axle construction is entirely dispensed with, and the front wheels 10 are mounted instead on side brackets 11 which are bolted or otherwise rigidly secured to the longitudinal side sill members 12 of the chassis. Inasmuch as the front wheel mountings at both sides of the chassis are substantially duplicates of each other, only one will be described.

Each one of the brackets 11 carries a vertically disposed knuckle pin 13 which is journaled in ball bearings 14 and 15 in the upper and lower portions of the bracket and is held against vertical movement therein. A vertically elongated tubular steering knuckle 16 is sleeved on the pin 13 and is provided with a laterally projecting spindle 17 on which the wheel 10 at that side of the chassis is journaled. The knuckle 16 is free to slide up and down on the pin 13 but is prevented from turning relative to the same by a spline 18.

The load supported by the wheel 10 is transmitted from the chassis to the knuckle 16 by a leaf spring 19 which is fastened to the chassis at 20 and extends laterally therefrom into the bracket 11. The outer end of the spring 19 is bifurcated and the two spaced end portions 21 are positioned at opposite sides of the knuckle 16 between upper and lower rubber blocks 22. The blocks 22 and the interposed end portions 21 are arranged within a centrally apertured container 23 through which the knuckle 16 extends and in which the knuckle is free to turn. The container 23 rests on end-thrust ball bearings 24 on a load-supporting ring 25 which is secured to the knuckle 16 about the bottom 26 of the same.

When the vehicle passes over rough portions of a road, the knuckle 16 carrying the wheels 10 rides up and down along the pin 13 against the yielding resistance of the spring 19, the bifurcation in the end of the spring being sufficiently deep to allow for the maximum elongation produced in the spring. The upward and downward movements of the end of the spring 19 are preferably limited by top and bottom rubber stop blocks 27 and 28 which are positioned in the bracket in the path of movement of the end of the spring. The upward movement of the knuckle 16 is preferably cushioned by a pair of telescopically associated cups 29 and 30 which are secured respectively to the pin 13 and the upper portion 31 of the knuckle 16 and provide not only a dash pot air cushion but a dust-proof enclosure for the knuckle assembly.

In steering the vehicle, the wheel 10, knuckle 16 and pin 13 are turned as a unit by a steering arm 32 which is keyed at 33 to the lower end of the pin 13. The arm 32 is connected in the usual way to the stering mechanism 34 carried by the chassis and is provided with another integrally associated arm portion 35 at right angles thereto which is connected by a tie rod 36 to the corresponding arm portion on the opposite wheel, whereby to cause both wheels to turn in unison.

In the form of the invention shown in Figs. 4 and 5 two coil springs 37 and 38 are employed in lieu of the leaf spring 19. The steering knuckles 39 are splined on vertical pins 40 which are journaled above and below the knuckles in vertically spaced portions of side brackets 41, and the springs 37 and 38 encircle the pins, the springs 37 being arranged above the knuckles to support the load thereon and the springs 38 being arranged below the knuckles to take up the rebound. The upper springs 37 are preferably housed in telescoping dust-proof casings 42 and 43. As in the form of the invention first described, the steering is effected from the steering mechanism 44 through connections with an arm 45 which is keyed to the lower end of one of the knuckle pins 40, and the wheels are caused to turn in unison by two arms 46 which are secured to the lower ends of the pins 40 and are coupled together with a tie rod 47.

The wheel mounting of the invention effectively prevents the wheels from wobbling and shimmying no matter how rough the road may be, the wheels being limited to a straight up and down movement which has no effect upon the steering connections.

This application is a continuation in part of my copending application Serial No. 253,016 which was filed February 9, 1928.

I claim:

In a motor vehicle, an axleless independently sprung front wheel mounting comprising, in combination with a chassis, a bracket which is directly connected with the chassis, a vertically disposed knuckle pin which is rotatable in the bracket, a wheel spindle which is mounted on the knuckle pin in non-rotatable association with the same, telescopic dash pot members housing the knuckle pin and engaged by the bracket and spindle respectively, resiliently yieldable means for resisting vertical movement of the spindle relative to the bracket, a steering mechanism carried by the chassis, a steering arm mounted on the pin in non-rotatable association with the same, a connection between the steering mechanism and the steering arm, and means for preventing the steering arm from moving vertically with respect to the bracket.

In witness whereof I have hereunto subscribed my name.

JAMES A WHITCOMB.